(12) United States Patent
Nagata et al.

(10) Patent No.: US 7,978,457 B2
(45) Date of Patent: Jul. 12, 2011

(54) ALL-SOLID-STATE ELECTRIC DOUBLE LAYER CAPACITOR

(75) Inventors: Kaoru Nagata, Osaka (JP); Tetsuo Nanno, Osaka (JP)

(73) Assignee: Panasonic Corporation, Osaka (JP)

( * ) Notice: Subject to any disclaimer, the term of this patent is extended or adjusted under 35 U.S.C. 154(b) by 612 days.

(21) Appl. No.: 11/943,659

(22) Filed: Nov. 21, 2007

(65) Prior Publication Data
US 2008/0117563 A1    May 22, 2008

(30) Foreign Application Priority Data

Nov. 21, 2006   (JP) ................... 2006-314663

(51) Int. Cl.
*H01G 9/00*    (2006.01)

(52) U.S. Cl. ........ 361/502; 361/503; 361/504; 361/509; 361/512; 361/523

(58) Field of Classification Search .......... 361/502–504, 361/508–512, 516–519, 523–529
See application file for complete search history.

(56) References Cited

U.S. PATENT DOCUMENTS

| | | | | |
|---|---|---|---|---|
| 5,754,393 A | * | 5/1998 | Hiratsuka et al. | 361/505 |
| 6,445,566 B2 | * | 9/2002 | Watanabe et al. | 361/502 |
| 6,838,211 B2 | * | 1/2005 | Banno et al. | 429/189 |
| 7,154,737 B2 | * | 12/2006 | Maruo et al. | 361/502 |
| 2005/0231894 A1 | * | 10/2005 | Yoshida et al. | 361/502 |

FOREIGN PATENT DOCUMENTS

| | | |
|---|---|---|
| JP | 2000-195759 | 7/2000 |
| JP | 2002-324734 A | 11/2002 |
| JP | 2004-067504 | 3/2004 |

* cited by examiner

*Primary Examiner* — Nguyen T Ha
(74) *Attorney, Agent, or Firm* — McDermott Will & Emery LLP (57) ABSTRACT

Disclosed is an all-solid-state electric double layer capacitor comprising a solid electrolyte and a current collector, wherein the solid electrolyte is an inorganic solid electrolyte. Such a capacitor has high capacity and is free from any fear of leakage of an electrolytic solution, and also ensures high heat resistance and enables a low process cost.

3 Claims, 6 Drawing Sheets

ALL-SOLID-STATE ELECTRIC DOUBLE LAYER CAPACITOR

BACKGROUND OF THE INVENTION

1. Field of the Invention

The present invention relates to an all-solid-state electric double layer capacitor, and particularly to improvement of a solid electrolyte.

2. Description of the Related Art

An electric double layer capacitor is a high-capacity capacitor in which an electric double layer is formed at an interface between an electrode and an electrolyte (electrolytic solution). Therefore, the electric double layer capacitor is used as a power source for backing up a PC power source, an in-vehicle power source, and the like by charges stored in the electric double layer capacitor upon temporary blackout of the power source. The electric double layer capacitor has a feature that it has high capacity and is capable of charging and discharging at high speed, and also causes less deterioration of performance even if charging and discharging are repeated.

With high-functionalization and miniaturization of PCs, there has recently been a demand for an electric double layer capacitor which can increase the capacity and also causes no leakage of an electrolytic solution providing high reliability. In order to obtain such an electric double layer capacitor, various studies have mainly been made on an electrolyte.

For example, Japanese Unexamined Patent Publication No. 2000-195759 proposes an electric double layer capacitor in which an electrolyte comprises a sulfonium salt having three alkyl groups of 1 to 6 carbon atoms. The patent document describes that, by using activated carbon as an electrode, propylene carbonate as a solvent and an electrolyte having a small ionic diameter such as triethylsulfonium tetrafluoroborate as the sulfonium salt, it becomes possible to insert a lot of the ions into pores of the activated carbon as the electrode, and thus a high-capacity electric double layer capacitor can be provided.

However, in the electric double layer capacitor as disclosed in Japanese Unexamined Patent Publication No. 2000-195759, an electrolytic solution is used and therefore deterioration and failure due to leakage of the electrolytic solution may arise.

Also, Japanese Unexamined Patent Publication No. 2002-324734 discloses a gel-like electrolyte for an aluminum electrolytic capacitor and a method for producing the same. The patent document proposes a composition forming the gel-like electrolyte, which is produced by radical polymerization of a polymerizable monomer using t-butylperoxybenzoate as an initiator, while aluminum is used as a current collector, imidazolium phthalate as an electrolyte and γ-butyrolactone as a solvent. The patent document describes that an electric double layer capacitor having high retention of an electrolytic solution and high heat resistance can be provided by using the gel-like electrolyte having high ionic conductivity.

However, in the capacitor using the gel-like electrolyte as disclosed in Japanese Unexamined Patent Publication No. 2002-324734, since the decomposition temperature of the gel-like electrolyte is usually about 250° C., the temperature range for operating this capacitor is limited to the range lower than the decomposition temperature of this gel-like electrolyte.

Furthermore, Japanese Unexamined Patent Publication No. 2004-067504 discloses a ceramic capacitor using barium titanate having a coated surface. The patent document proposes a laminated ceramic capacitor produced by forming barium titanate coated with a metal oxide, a metal hydrous oxide, a metal hydroxide or an organic acid salt of a metal other than barium or titanium into a green sheet, by alternately laminating the green sheet with a conductive agent and by sintering the laminate. The patent document describes that, by using barium titanate having the coated surface as a dielectric, short-circuiting becomes less likely to occur even if the thickness of the dielectric is decreased, thus making it possible to supply a high-capacity capacitor.

However, in the case of the ceramic capacitor disclosed in Japanese Unexamined Patent Publication No. 2004-067504, the thickness of the dielectric layer is decreased and therefore dielectric breakdown becomes more likely to occur. Also, a process for coating barium titanate is required and the sintering temperature of barium titanate itself is a high temperature of about 1,100 to 1,200° C., resulting in a high process cost.

SUMMARY OF THE INVENTION

An object of the present invention is to provide an all-solid-state electric double layer capacitor which maintains high capacity and is free from any fear of leakage of an electrolytic solution, and is also excellent in heat resistance and enables a low process cost.

One aspect of the present invention pertains to an all-solid-state electric double layer capacitor comprising a solid electrolyte and a current collector, wherein the solid electrolyte is an inorganic solid electrolyte.

Objects, features, aspects and advantages of the present invention become more apparent from the following detailed description and accompanying drawings.

DETAILED DESCRIPTION OF THE INVENTION

The solid electrolyte included in the all-solid-state electric double layer capacitor according to one embodiment of the present invention is an inorganic solid electrolyte. The use of the inorganic solid electrolyte as the solid electrolyte ensures high heat resistance and also enables a low process cost without causing leakage of an electrolytic solution. As the inorganic solid electrolyte, an ion conductive compound capable of forming an electric double layer at an interface between an electrode and an electrolyte can be used. Examples of the ion conductive compound include a hydrogen-ion conductive compound, a Li-ion conductive compound, a Na-ion conductive compound, and an oxygen-ion conductive compound. These ion conductive compounds are inorganic compounds such as an inorganic acid compound containing Li and a composite oxide of Li and other metals in the case of the Li-ion conductive compound.

The inorganic solid electrolyte in the present embodiment preferably contains at least one kind of a compound selected from the group consisting of a Li-ion conductive compound and a Na-ion conductive compound.

The Li-ion conductive compound is a compound which has high ionic conductivity and low electron conductivity, and is also comparatively less likely to react with water. Therefore, it is possible to obtain a solid electrolyte, which is free from leakage of an electrolytic solution and also has high heat resistance and high capacity, by using the Li-ion conductive compound as the solid electrolyte.

Also, the Na-ion conductive compound has a feature that it not only has high ionic conductivity, low electron conductivity and low reactivity with water, but also has a wide temperature range operable as an ionic conductor. For example, the operable temperature range is within a range from room temperature to about 800° C. Therefore, it is possible to obtain a solid electrolyte, which has high capacity and high heat resistance, and is also operable in a wide temperature range, by using the Na-ion conductive compound as the solid electrolyte.

As the Li-ion conductive compound in the present embodiment, it is preferred to use a phosphate compound represented by the general formula: $Li_{1+X}M^1_XTi_{2-X}(PO_4)_3$ (where $M^1$ represents at least one kind of metal selected from the group consisting of Al, Y, Ga, In and La, and X satisfies the following relation: $0 \leq X \leq 0.6$). When the composition ratio of metal $M^1$ satisfies the following relation: $0 \leq X \leq 0.6$, the metal $M^1$ cooperates with Ti and the phosphate compound can exhibit high ionic conductivity at room temperature. Ionic conductivity of the phosphate compound is about $2 \times 10^{-3}$ S/cm. The phosphate compound can act as a high-capacity Li-ion conductor by this high ionic conductivity.

Also, it is preferred to use a phosphate compound represented by $LiSn_2(PO_4)_3$ as the Li-ion conductive compound. A Li-ion conductor can be obtained at low cost by using the phosphate compound containing Sn because the sintering temperature during synthesis is low and $SnO_2$ used as a raw material is cheap. The temperature in sintering process can be lowered to about 900° C.

Furthermore, it is preferred to use, as the Li-ion conductive compound, an oxide represented by the general formula: $(Li_{0.39}La_{0.54})_{1-Y/2}M^2_YTi_{1-Y}O_3$ (where $M^2$ represents at least one kind of metal selected from the group consisting of Al and Cr, and Y satisfies the following relation: $0 \leq Y \leq 0.06$). When the composition ratio of metal $M^2$ satisfies the following relation: $0 \leq Y \leq 0.06$, the oxide containing La and Ti can exhibit high ionic conductivity and high density of about 5 g/cm$^3$. As a result, the oxide can act as a Li-ion conductor having high capacity per unit volume.

Also, it is preferred to use, as the Li-ion conductive compound, an oxide represented by the general formula: $(Li_{0.5}La_{0.5})Ti_{1-Z}M^3_ZO_3$ (where $M^3$ represents at least one kind of metal selected from the group consisting of Ge, Sn, Mn and Zr, and Z satisfies the following relation: $0 \leq z \leq 1$). When the composition ratio of metal $M^3$ satisfies the following relation: $0 \leq z \leq 1$, the oxide containing La and Ti is a Li-ion conductor which can exhibit high ionic conductivity and high density.

As the Na-ion conductive compound in the present embodiment, it is preferred to use an oxide represented by the general formula: $Na_{1+\gamma}Zr_{2-\beta}Y_\beta P_{3-\gamma}Si_\gamma O_{12}$ (where $\gamma$ satisfies the following relation: $0 \leq \gamma \leq 3$, and $\beta$ satisfies the following relation: $0 \leq \beta \leq 2$). When a composition ratio of Y satisfies the following relation: $0 \leq \beta \leq 2$, and the composition ratio of Si satisfies the following relation: $0 \leq \gamma \leq 3$, Y and Si cooperate with Zr and P, and the oxide can exhibit high ionic conductivity, while the synthesis temperature can be lowered. The synthesis temperature of the oxide is about 1,200° C. and can be lowered as compared with the case where the synthesis temperature of $\beta$-$Al_2O_3$ is about 1,400° C. The process cost for the oxide can be reduced by lowering the synthesis temperature.

Also, it is preferred to use, as the Na-ion conductive compound, a phosphate compound represented by the general formula $Na_{1+\alpha}M^4_\alpha M^5_{2-\alpha}(PO_4)_3$ (where $M^4$ represents at least one kind of metal selected from Al and In, $M^5$ represents at least one kind of metal selected from the group consisting of Ge, Sn, Ti, Zr and Hf, and $\alpha$ satisfies the following relation: $0 \leq \alpha \leq 2$). When the composition ratio of metal $M^4$ satisfies the following relation: $0 \leq \alpha \leq 2$, the metal $M^4$ cooperates with metal $M^5$ and the phosphate compound can exhibit high ionic conductivity, while the synthesis temperature can be lowered to about 1,200° C.

The ion conductive compound which is contained in the inorganic solid electrolyte included in the all-solid-state electric double layer capacitor according to the present embodiment can be synthesized by mixing raw materials followed by using a firing method. The firing temperature can be appropriately selected depending on the ion conductive compound to be produced. For example, the firing temperature can be selected within a range from 200 to 1,250° C. and a firing time can be selected within a range from 3 to 48 hours. If necessary, an improvement such as retention of a uniform firing state can be made by firing at multiple stages while varying the firing temperature and the firing time.

The inorganic solid electrolyte can be produced by grinding the fired ion conductive compound, adding a binder, a solvent and a plasticizer, forming the mixture into a pellet, and firing the pellet.

As the binder, the solvent and the plasticizer used to produce the inorganic solid electrolyte, various ones can be appropriately used.

For example, a polyvinyl butyral resin can be used as the binder, n-butyl acetate can be used as the solvent, and dibutyl phthalate can be used as the plasticizer.

The firing temperature can be appropriately selected depending on the inorganic solid electrolyte to be produced. For example, the firing temperature can be selected within a range from 400 to 1230° C., while the firing time can be selected within a range from 3 to 70 hour. If necessary, improvements such as densification of the inorganic solid electrolyte and suppression of pellet distortion can be made by firing at multiple stages while varying the firing temperature and the firing time.

It is possible to obtain an all-solid-state electric double layer capacitor having a structure in which current collectors face each other with the inorganic solid electrolyte interposed therebetween, for example, by forming an electrode on both surfaces of the inorganic solid electrolyte obtained by forming into a predetermined shape and firing.

For example, the electrode can be formed by subjecting the inorganic solid electrolyte, which is obtained by forming into a pellet and firing the pellet, to gold sputtering. When a sputtering method cannot be used because of operating environment, cost or other requirement, various methods such as a thin film method, a coating method, a thermal spraying method and a plating method can be applied. It is possible to use, as an electrode material, various metals such as Ni in addition to Au, alloys and conductive pastes.

By using the ion conductive compound thus prepared, it is also possible to obtain an all-solid-state electric double layer capacitor having a structure in which the inorganic solid electrolytes and the current collectors are alternately laminated.

For example, first, the fired ion conductive compound is ground and then, a binder, a solvent and a plasticizer are added to prepare a slurry. Green sheets are formed using the slurry and an electrode paste is printed on the green sheets. The green sheets are laminated, hot-pressed and, after cutting, the resulting green tip is fired. Then, an external electrode is provided, and thus an all-solid-state electric double layer capacitor can be obtained with good productivity.

As the binder, the solvent and the plasticizer used to produce the slurry, various ones can be appropriately used. For example, a polyvinyl butyral resin can be used as the binder, n-butyl acetate can be used as the solvent, and dibutyl phthalate can be used as the plasticizer.

The green sheet is preferably formed by coating the slurry on a carrier film and drying the slurry. It is preferred to use, as the carrier film, a film made of a polyethylene resin which contains a polyethylene resin as a main component and has a release-agent layer on the surface, in view of productivity and cost. It is possible to use, as the coating method, various coating methods used to form a green sheet of a ceramic capacitor, for example, a doctor-blade method.

In the case of printing the electrode paste on the green sheet, it is preferred to prepare two kinds of green sheets, namely, a green sheet obtained by printing the electrode paste in a cross-woven lattice pattern and a green sheet with a cross-woven lattice pattern shifted by one half pitch. This preparation enables to obtain the green sheet having a structure in which electrodes are alternately exposed from both ends of cut pieces after lamination and cutting, which is suited for use in the electric double layer having the laminated structure.

Two kinds of green sheets comprising the printed electrode in the cross-woven lattice pattern are alternately laminated. After lamination, hot pressing is preferably performed. The conditions of hot pressing can be appropriately selected depending on the material and the thickness of green sheets to be laminated. For example, hot pressing can be performed at 80° C. under a pressure of 100 kg/cm$^2$.

The laminate is preferably cut at the center of the lattice serving as the electrode. Thus, it is possible to obtain green tips, each being an individual piece of the green sheet laminate in which internal electrodes are alternately exposed at the end face.

The green tip is preferably fired by debindering and sintering in a state of being interposed between two ceramic plates, and thus the all-solid-state electric double layer capacitor having stable quality can be obtained without causing delamination. The conditions of debindering and sintering can be appropriately selected depending on the material and the thickness of the green tip. For example, debindering can be performed by heating to 350° C. at a temperature-rise rate of 400° C./h and maintaining at the same temperature for 5 hours, while sintering is performed at a sintering temperature of 900° C. after heating at a temperature-rise rate of 400° C./h.

The external electrode is provided by connecting a metal to the internal electrode exposed from the sintered tip. There are no restrictions on the material and the method to be used. According to characteristics requirements, operating environment and cost, for example, an external electrode material and a method used to form an external electrode of a ceramic capacitor, such as tin plating, can be applied.

While embodiments of the present invention have been described in detail, these are exemplary of the invention in all aspects and are not to be considered as limiting. It should be understood that numerous modifications that are not illustrated can be made without departing from the scope of the present invention.

The present invention will now be described by way of examples, but the present invention is not limited to the following examples.

EXAMPLES

Example 1

Figure 9:
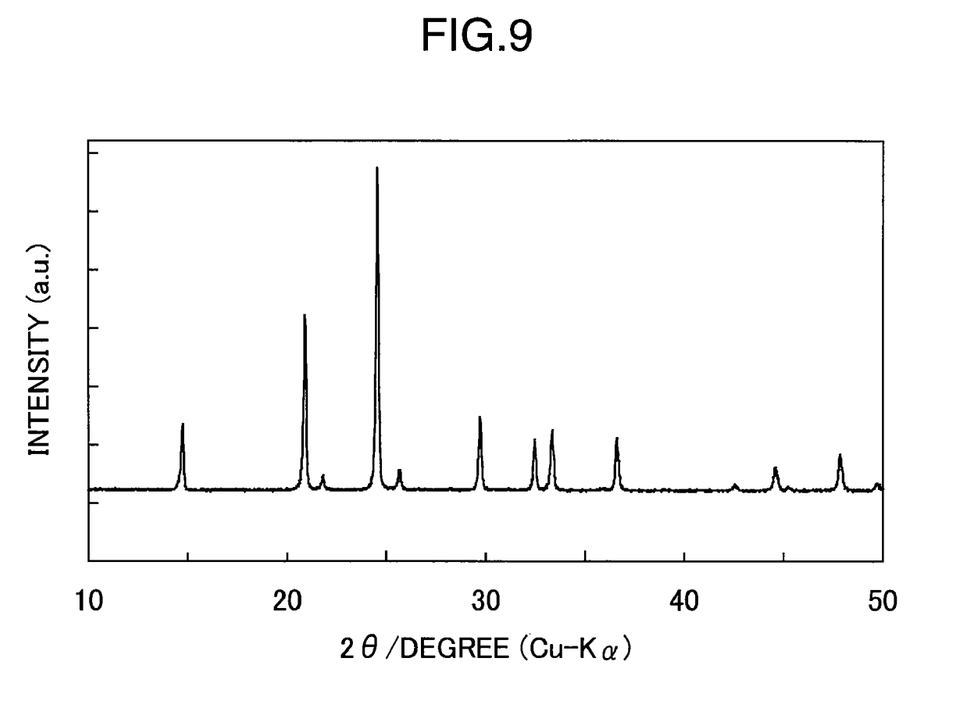
FIG. 9 is a graph showing an X-ray diffraction image of the Li-ion conductive compound in Example 1 of the present invention.

A Li-ion conductive compound $Li_{1.3}Al_{0.3}Ti_{1.7}(PO_4)_3$ was synthesized. A mixture of $Li_2CO_3$, $Al_2O_3$, $TiO_2$, $(NH_4)_2HPO_4$ in a stoichiometric ratio was sufficiently mixed in an agate mortar and then mixed with 2-propanol as a solvent by zirconia balls having a diameter of 5 mm in a ball mill for 12 hours. After removing 2-propanol as the solvent by an evaporator, the residue was placed in a platinum crucible and fired at 900° C. for 3 hours. The resulting fired powder was ground in an agate mortar, placed again in the platinum crucible and then fired at 900° C. for 3 hours. The resulting powder of $Li_{1.3}Al_{0.3}Ti_{1.7}(PO_4)_3$ was ground in an agate mortar and an X-ray diffraction image was measured. The results are shown in FIG. 9.

To the synthesized Li-ion conductive compound $Li_{1.3}Al_{0.3}Ti_{1.7}(PO_4)_3$, a polyvinyl butyral resin as a binder, n-butyl acetate as a solvent and dibutyl phthalate as a plasticizer were added, and the mixture was formed into a pellet having a diameter of 18.0 mm. The pellet thus formed was interposed between plates made of alumina, fired at 400° C. for 5 hours to remove the binder, and then sintered at 900° C. for 5 hours. The sintered pellet had a diameter of 14.5 mm and a thickness of 0.97 mm. A gold film was formed on both surfaces of the pellet of the inorganic solid electrolyte 2 using a sputtering method to form an electrode 1, and thus the all-solid-state electric double layer capacitor shown in FIG. 1 was produced.

Example 2

Under the same conditions as in Example 1, a Li-ion conductive compound $Li_{1.3}Al_{0.3}Ti_{1.7}(PO_4)_3$ was synthesized and then formed into a pellet under the same conditions as in Example 1 so that the fired pellets have a thickness of about 2 mm and 3 mm. After sintering, the pellets had the thickness of 1.9 mm and 2.9 mm and the same diameter of 14.5 mm. In the same manner as in Example 1, a gold film was formed on both surfaces of the pellets of the inorganic solid electrolyte 2 using a sputtering method to form an electrode 1, and thus an all-solid-state electric double layer capacitor shown in FIG. 1 was produced.

Example 3

A Li-ion conductive compound $LiSn_2(PO_4)_3$ was synthesized. In the same manner as in Example 1, a mixture of $SnO_2$, $Li_2CO_3$ and $(NH_4)_2HPO_4$ in a stoichiometric ratio was mixed, sintered at 400° C. for 3 hours, ground in an agate mortar and then fired at 1,250° C. for 48 hours.

Figure 1:
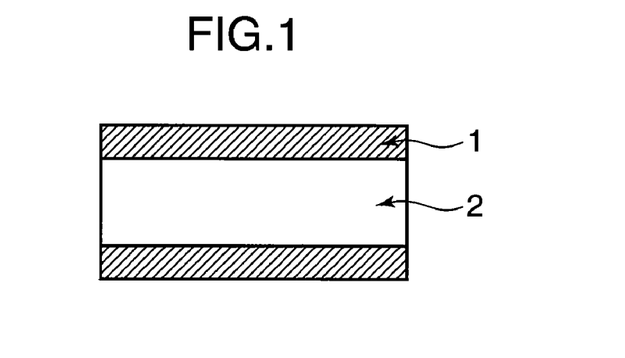
FIG. 1 is a schematic sectional view showing one example of the all-solid-state electric double layer capacitor according to one embodiment of the present invention.

In the same manner as in Example 1, the synthesized powder of $LiSn_2(PO_4)_3$ was formed into a pellet and then sintered at 870° C. for 5 hours. In the same manner as in Example 1, as shown in FIG. 1, a gold film was formed on both surfaces of the pellet of the inorganic solid state electrolyte 2 to form an electrode 1, and thus an all-solid-state electric double layer capacitor was produced.

Example 4

A Li-ion conductive compound $Li_{0.3861}La_{0.5346}Al_{00.2}Ti_{0.98}O_3$ was synthesized. $Li_{0.3861}La_{0.5346}Al_{00.2}Ti_{0.98}O_3$ was obtained by mixing a mixture of $La_2O_3$, $Li_2CO_3$, $TiO_2$ and $Al_2O_3$ in a stoichiometric ratio in an agate mortar. The mixed powder was fired at 800° C. for 3 hours, ground in an agate mortar and then fired at 1,000° C. for 12 hours. Under the same conditions as in Example 1, the fired powder was formed into a pellet and sintered at 1,200° C. for 6 hours. In the same manner as in Example 1, as shown in FIG. 1, a gold film was formed on both surfaces of the pellet of the electrolyte 2 to form an electrode 1, and thus an all-solid-state electric double layer capacitor was produced.

Example 5

A Li-ion conductive compound $Li_{0.5}La_{0.5}TiO_3$ was synthesized. $Li_{0.5}La_{0.5}TiO_3$ was obtained by mixing in the same manner as in Example 1, except that a mixture of $La_2O_3$, $Li_2CO_3$ and $TiO_2$ in a stoichiometric ratio was used and ethanol was used as the solvent. The mixed powder was fired at 850° C. for 10 hours, formed into a pellet under the same conditions as in Example 1 and then sintered at 1,300° C. for 7 hours. In the same manner as in Example 1, as shown in FIG. 1, a gold film was formed on both surfaces of the pellet of the electrolyte 2 to form an electrode 1, and thus an all-solid-state electric double layer capacitor was produced.

Example 6

A Na-ion conductive compound $Na_{1.4}Al_{0.4}Ti_{1.6}(PO_4)_3$ was synthesized. $Na_{1.4}Al_{0.4}Ti_{1.6}(PO_4)_3$ was obtained by mixing a mixture of $Na_2CO_3$, $\alpha$-$Al_2O_3$, $(NH_4)_2HPO_4$ and $TiO_2$ in a stoichiometric ratio in an agate mortar. The resulting powder was fired at 200° C. for 4 hours and then fired at 300° C. for 8 hours. The powder was formed into a pellet and then fired at 725° C. for 24 hours. The fired powder was ground in an agate mortar, formed again into a pellet and then fired at 850° C. for 3 hours. The resulting $Na_{14}Al_{0.4}Ti_{1.6}(PO_4)_3$ was ground, formed into a pellet in the same manner as in Example 1 and then sintered at 900° C. for 70 hours. In the same manner as in Example 1, as shown in FIG. 1, a gold film was formed on both surfaces of the pellet of the electrolyte 2 to form an electrode 1, and thus an all-solid-state electric double layer capacitor was produced.

Example 7

A Na-ion conductive compound $Na_3Si_2Zr_{1.88}Y_{0.12}PO_{12}$ was obtained by mixing a mixture of $SiO_2$, $(ZrO_2)_{0.97}$ $(Y_2O_3)_{0.03}$ and $Na_3PO_4 \cdot 12H_2O$ in a stoichiometric ratio in the same manner as in Example 1. The mixture was fired at 1,100° C. for 8 hours and then ground. The resulting $Na_3Si_2Zr_{1.88}Y_{0.12}PO_{12}$ was formed into a pellet and then sintered at 1,230° C. for 10 hours. In the same manner as in Example 1, as shown in FIG. 1, a gold film was formed on both surfaces of the pellet of the electrolyte 2 to form an electrode 1, and thus an all-solid-state electric double layer capacitor was produced.

Example 8

A Li-ion conductive compound $Li_{1.3}Y_{0.3}Ti_{1.7}(PO_4)_3$ was synthesized. $Li_{1.3}Y_{0.3}Ti_{1.7}(PO_4)_3$ was obtained by sufficiently mixing a mixture of $Li_2CO_3$, $Y_2O_3$, $TiO_2$ and $(NH_4)_2HPO_4$ in a stoichiometric ratio in an agate mortar. The powder was fired at 500° C. for 24 hours, ground in an agate mortar, fired at 900° C. for one hour and then fired at 1,000° C. for 2 hours. Under the same conditions as in Example 1, the fired powder was formed into a pellet and then sintered at 1,020° C. for 2 hours. In the same manner as in Example 1, as shown in FIG. 1, a gold film was formed on both surfaces of the pellet of the electrolyte 2 to form an electrode 1, and thus an all-solid-state electric double layer capacitor was produced.

Example 9

A Li-ion conductive compound $Li_{1.2}Ga_{0.2}Ti_{1.8}(PO_4)_3$ was synthesized. $Li_{1.2}Ga_{0.2}Ti_{1.8}(PO_4)_3$ was obtained by sufficiently mixing a mixture of $Li_2CO_3$, $Ga_2O_3$, $TiO_2$ and $(NH_4)_2HPO_4$ in a stoichiometric ratio in an agate mortar. The powder was fired at 900° C. for 3 hours, ground in an agate mortar and then fired at 900° C. for one hour. Under the same conditions as in Example 1, the fired powder was formed into a pellet and then sintered at 900° C. for 2 hours. In the same manner as in Example 1, as shown in FIG. 1, a gold film was formed on both surfaces of the pellet of the electrolyte 2 to form an electrode 1, and thus an all-solid-state electric double layer capacitor was produced.

Example 10

A Li-ion conductive compound $Li_{1.2}In_{0.2}Ti_{1.8}(PO_4)_3$ was synthesized. $Li_{1.2}In_{0.2}Ti_{1.8}(PO_4)_3$ was obtained by sufficiently mixing a mixture of $Li_2CO_3$, $In_2O_3$, $TiO_2$ and $(NH_4)_2HPO_4$ in a stoichiometric ratio in an agate mortar. The powder was fired at 900° C. for 3 hours, ground in an agate mortar and then fired at 900° C. for one hour. Under the same conditions as in Example 1, the fired powder was formed into a pellet and then sintered at 900° C. for 2 hours. In the same manner as in Example 1, as shown in FIG. 1, a gold film was formed on both surfaces of the pellet of the electrolyte 2 to form an electrode 1, and thus an all-solid-state electric double layer capacitor was produced.

Example 11

A Li-ion conductive compound $Li_{0.3861}La_{0.5346}Cr_{0.02}Ti_{0.98}O_3$ was synthesized. $Li_{0.386}La_{0.5346}Cr_{0.02}Ti_{0.98}O_3$ was obtained by mixing a mixture of $La_2O_3$, $Li_2CO_3$, $TiO_2$ and $Cr_2O_3$ in a stoichiometric ratio in an agate mortar. The mixed powder was fired at 800° C. for 3 hours, ground in an agate mortar and then fired at 1,000° C. for 12 hours. Under the same conditions as in Example 1, the fired powder was formed into a pellet and then sintered at 1,200° C. for 6 hours. In the same manner as in Example 1, as shown in FIG. 1, a gold film was formed on both surfaces of the pellet of the electrolyte 2 to form an electrode 1, and thus an all-solid-state electric double layer capacitor was produced.

Example 12

A Li-ion conductive compound $Li_{0.5}La_{0.5}Ti_{0.94}Sn_{0.06}O_3$ was synthesized. $Li_{0.5}La_{0.5}Ti_{0.94}Sn_{0.06}O_3$ was obtained by mixing a mixture of $La_2O_3$, $Li_2CO_3$, $TiO_2$ and $SnO_2$ in a stoichiometric ratio in the same manner as in Example 1. The mixed powder was fired at 850° C. for 10 hours, formed into a pellet under the same conditions as in Example 1 and then sintered at 1,300° C. for 7 hours. In the same manner as in Example 1, as shown in FIG. 1, a gold film was formed on both surfaces of the pellet of the electrolyte 2 to form an electrode 1, and thus an all-solid-state electric double layer capacitor was produced.

Example 13

A Li-ion conductive compound $Li_{0.5}La_{0.5}Ti_{0.94}Zr_{0.06}O_3$ was synthesized. $Li_{0.5}La_{0.5}Ti_{0.94}Zr_{0.06}O_3$ was obtained by mixing a mixture of $La_2O_3$, $Li_2CO_3$, $TiO_2$ and $ZrO_2$ in a stoichiometric ratio in the same manner as in Example 1. The mixed powder was fired at 850° C. for 10 hours, formed into a pellet under the same conditions as in Example 1 and then sintered at 1,300° C. for 7 hours. In the same manner as in Example 1, as shown in FIG. 1, a gold film was formed on both surfaces of the pellet of the electrolyte 2 to form an electrode 1, and thus an all-solid-state electric double layer capacitor was produced.

Example 14

A Li-ion conductive compound $Li_{0.5}La_{0.5}Ti_{0.992}Mn_{0.008}O_3$ was synthesized. $Li_{0.5}La_{0.5}Ti_{0.992}Mn_{0.0008}O_3$ was obtained by mixing a mixture of $La_2O_3$, $Li_2CO_3$, $TiO_2$ and $MnO_2$ in a stoichiometric ratio in the same manner as in Example 1. The mixed powder was fired at 850° C. for 10 hours, formed into a pellet under the same conditions as in Example 1 and then sintered at 1,300° C. for 7 hours. In the same manner as in Example 1, as shown in FIG. 1, a gold film was formed on both surfaces of the pellet of the electrolyte 2 to form an electrode 1, and thus an all-solid-state electric double layer capacitor was produced.

Example 15

A Li-ion conductive compound $Li_{0.5}La_{0.5}Ti_{0.992}Ge_{0.008}O_3$ was synthesized. $Li_{0.5}La_{0.5}Ti_{0.992}Ge_{0.00008}O_3$ was obtained by mixing a mixture of $La_2O_3$, $Li_2CO_3$, $TiO_2$ and $GeO_2$ in a stoichiometric ratio in the same manner as in Example 1. The mixed powder was fired at 850° C. for 10 hours, formed into a pellet under the same conditions as in Example 1 and then sintered at 1,300° C. for 7 hours. In the same manner as in Example 1, as shown in FIG. 1, a gold film was formed on both surfaces of the pellet of the electrolyte 2 to form an electrode 1, and thus an all-solid-state electric double layer capacitor was produced.

Example 16

A Na-ion conductive compound $Na_{1.4}Al_{0.4}Ge_{1.6}(PO_4)_3$ was synthesized. $Na_{1.4}Al_{0.4}Ge_{1.6}(PO_4)_3$ was obtained by mixing a mixture of $Na_2CO_3$, $\alpha\text{-}Al_2O_3$, $(NH_4)_2HPO_4$ and $GeO_2$ in a stoichiometric ratio in an agate mortar. The resulting powder was fired at 200° C. for 4 hours, fired at 300° C. for 8 hours and then ground. The powder was formed into a pellet and then fired at 725° C. for 24 hours firing. The fired powder was ground in an agate mortar, formed again into a pellet and then fired at 850° C. for 3 hours. The resulting $Na_{1.4}Al_{0.4}Ge_{1.6}(PO_4)_3$ was ground, formed into a pellet under the same conditions as in Example 1 and then sintered at 900° C. for 70 hours. In the same manner as in Example 1, as shown in FIG. 1, a gold film was formed on both surfaces of the pellet of the electrolyte 2 to form an electrode 1, and thus an all-solid-state electric double layer capacitor was produced.

Example 17

A Na-ion conductive compound $Na_{1.4}Al_{0.4}Sn_{1.6}(PO_4)_3$ was synthesized. $Na_{1.4}Al_{0.4}Sn_{1.6}(PO_4)_3$ was obtained by mixing a mixture of $Na_2CO_3$, $\alpha\text{-}Al_2O_3$, $(NH_4)_2HPO_4$ and $SnO_2$ in a stoichiometric ratio in an agate mortar. The resulting powder was fired at 200° C. for 4 hours, fired at 300° C. for 8 hours and then ground. The powder was formed into a pellet and then fired at 1,100° C. for 24 hours. The resulting $Na_{1.4}Al_{0.4}Sn_{1.6}(PO_4)_3$ was ground, formed again into a pellet and then sintered at 1,100° C. for 14 hours. In the same manner as in Example 1, as shown in FIG. 1, a gold film was formed on both surfaces of the pellet of the electrolyte 2 to form an electrode 1, and thus an all-solid-state electric double layer capacitor was produced.

Example 18

A Na-ion conductive compound $Na_{1.4}Al_{0.4}Zr_{1.6}(PO_4)_3$ was synthesized. $Na_{1.4}Al_{0.4}Zr_{1.6}(PO_4)_3$ was obtained by mixing a mixture of $Na_2CO_3$, $\alpha\text{-}Al_2O_3$, $(NH_4)_2HPO_4$ and $ZrO_2$ in a stoichiometric ratio in an agate mortar. The resulting powder was maintained at 200° C. for 4 hours, fired at 300° C. for 8 hours firing and then ground. The powder was formed into a pellet and then fired at 1,100° C. for 24 hours. The resulting $Na_{1.4}Al_{0.4}Zr_{1.6}(PO_4)_3$ was ground, formed again into a pellet and then fired at 1,100° C. for 14 hours. The fired powder was ground, formed again into a pellet and then sintered at 1,100° C. for 14 hours. In the same manner as in Example 1, as shown in FIG. 1, a gold film was formed on both surfaces of the pellet of the electrolyte 2 to form an electrode 1, and thus an all-solid-state electric double layer capacitor was produced.

Example 19

A Na-ion conductive compound $Na_{1.4}Al_{0.4}Hf_{1.6}(PO_4)_3$ was synthesized. $Na_{1.4}Al_{0.4}Hf_{1.6}(PO_4)_3$ was obtained by mixing a mixture of $Na_2CO_3$, $\alpha\text{-}Al_2O_3$, $(NH_4)_2HPO_4$ and $HfO_2$ in a stoichiometric ratio in an agate mortar. The resulting powder was fired at 200° C. for 4 hours, fired at 300° C. for 8 hours and then ground. The powder was formed into a pellet and then fired at 1,100° C. for 24 hours. The resulting $Na_{14}Al_{0.4}Hf_{1.6}(PO_4)_3$ was ground, formed again into a pellet and then sintered at 1,100° C. for 14 hours. In the same manner as in Example 1, as shown in FIG. 1, a gold film was formed on both surfaces of the pellet of the electrolyte 2 to form an electrode 1, and thus an all-solid-state electric double layer capacitor was produced.

Example 20

An all-solid-state electric double layer capacitor having a laminated structure was produced. First, a slurry was prepared. To a Li-ion conductive compound $Li_{1.3}Al_{0.3}Ti_{1.7}(PO_4)_3$ produced in the same manner as in Example 1, a polyvinyl butyral resin as a binder, n-butyl acetate as a solvent and dibutyl phthalate as a plasticizer were added, followed by mixing together with zirconia balls in a ball mill for 24 hours to prepare the slurry.

Then, green sheets were produced. On a carrier film containing a polyethylene resin as a main component, the film comprising a release-agent layer formed on the surface, the slurry was coated using a doctor blade-method. Subsequently, the slurry coated on the carrier film was dried to obtain a green sheet (thickness: 25 μm).

Then, on the green sheet, a Pt paste was printed in a cross-woven lattice pattern. At this time, green sheets with a cross-woven lattice pattern shifted by one half pitch formed on the surface were also produced, and twenty-five green sheets were alternately laminated. Upon lamination, a polyethylene film with an adhesive on both surfaces was fixed on a support base and a green sheet was laid thereon, and then hot pressing was performed by applying a pressure of 100 kg/cm$^2$ at 80° C. on the carrier film. After hot pressing, the carrier film was removed. The resulting laminated green sheets were cut at the center of the lattice serving as the electrode printed on the laminated green sheets to form green tips of 7 mm square of a laminate in which Pt internal electrodes are alternately exposed at the end face. The green tip was interposed between two alumina ceramic plates and, after heating to 350° C. in an air at a temperature-rise rate of 400° C./h, debindering was performed at 350° C. for 5 hours. After heating to 900° C. at a temperature-rise rate of 400° C./h and cooling, a sintered body was obtained. The resulting sintered body was tin plated to form an external electrode, and thus an all-solid-state electric double layer capacitor was produced.

Example 21

Instead of a structure in which current collectors face each other with the solid electrolyte containing $Li_{1.3}Al_{0.3}Ti_{1.7}(PO_4)_3$ prepared in Example 1 interposed therebetween, two gold films serving as a current collector were formed by sputtering on the same side of the solid electrolyte.

Comparative Example 1

A conventional electric double layer capacitor (EECS0HD223(V) manufactured by Panasonic Corp.) comprising an electrolytic solution prepared by dissolving an electrolyte in a propylene carbonate-based solvent was prepared and subjected to a heat resistance test.

The above respective electric double layer capacitors were subjected to the following tests.
<Measurement of Capacitor's Capacity and Thickness Dependence of Capacity>

Figure 2:
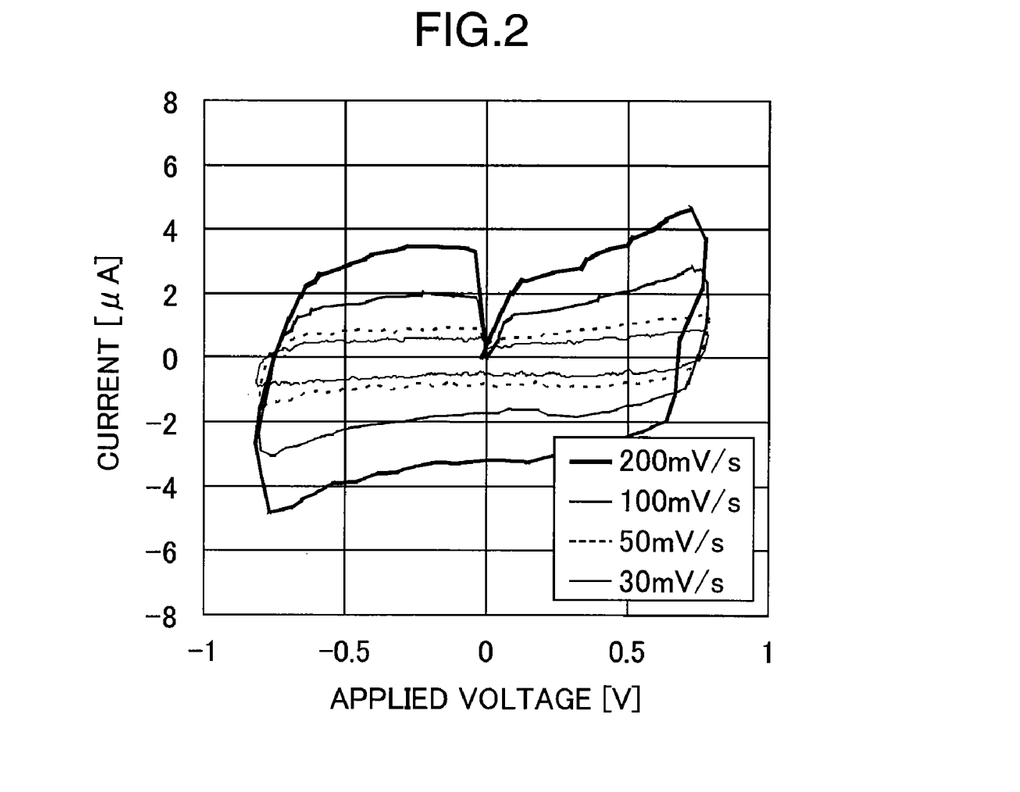
FIG. 2 is a schematic graph showing electrochemical characteristics in the all-solid-state electric double layer capacitor of Example 1 of the present invention.

When a voltage (ranging from −0.8 to 0.8 V) was applied to the all-solid-state electric double layer capacitor produced in Example 1 at a sweep rate of 30, 50, 100 or 200 mV/s, the current value was measured at a measuring temperature of 20° C. The resulting cyclic voltammogram is shown in FIG. 2. It has been found that, when a voltage (ranging from −0.8 to 0.8 V) was applied to a solid electrolyte containing $Li_{1.3}Al_{0.3}Ti_{1.7}(PO_4)_3$ at a sweep rate of dV/dt, capacitor's capacity is stored in accordance with the following formula:

$$I \times (dV/dt)$$

where I denotes the flowed current value. The resulting capacitor's capacity is shown in Table 1.

Since an electrolytic solution was not used, leakage of the electrolytic solution did not occur as a matter of course. When the capacitor was allowed to stand for several hours after charging, the capacitor's capacity became approximately 0.

Figure 3:
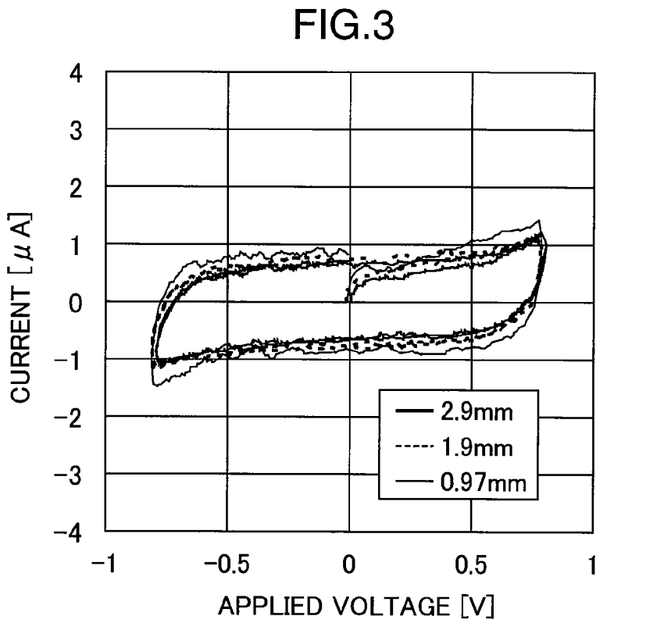
FIG. 3 is a schematic graph showing electrochemical characteristics in the all-solid-state electric double layer capacitor of Example 2 of the present invention.

With respect to solid electrolytes having three kinds of thicknesses, for example, the solid electrolytes containing $Li_{1.3}Al_{0.3}Ti_{1.7}(PO_4)_3$ produced in Example 2 and the solid electrolyte produced in Example 1, the capacitor's capacity of the all-solid-state electric double layer capacitor was measured. When a voltage (ranging from −0.8 to 0.8 V) was applied to the all-solid-state electric double layer capacitor at a sweep rate of 50 mV/s, the current value was measured at a measuring temperature of 20° C. The resulting cyclic voltammogram is shown in FIG. 3. It has been found that the capacitor's capacity does not depend on the thickness of the electrolyte. Thus, it was considered that the stored capacitor's capacity is not induced by applying a voltage to a dielectric, but is derived from an electric double layer. Also, since an electrolytic solution was not used, leakage of the electrolytic solution did not occur as a matter of course.

Figure 4:
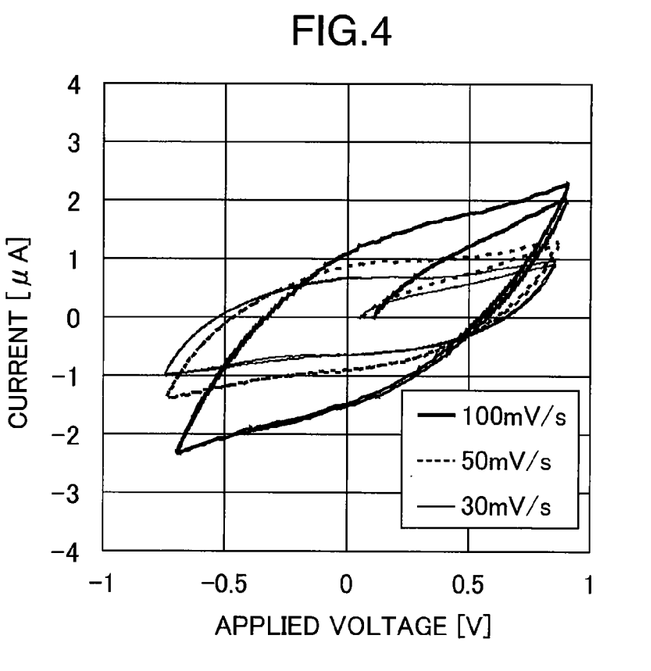
FIG. 4 is a schematic graph showing electrochemical characteristics in the all-solid-state electric double layer capacitor of Example 3 of the present invention.

When a voltage (ranging from −0.7 to 0.7 V) was applied to the all-solid-state electric double layer capacitor made of the solid electrolyte containing $LiSn_2(PO_4)_3$ produced in Example 3 at a sweep rate of 30, 50 and 100 mV/s, the current value was measured at a measuring temperature of 20° C. The resulting cyclic voltammogram is shown in FIG. 4. It has been found that the solid electrolyte containing $LiSn_2(PO_4)_3$ stores the capacitor's capacity similar to Example 1. The capacitor's capacity is shown in Table 1. It has also been confirmed that, with respect to the solid electrolyte containing $LiSn_2(PO_4)_3$, the capacitor's capacity does not depend on the thickness of the electrolyte similar to Example 2. Thus, it was considered that the capacitor's capacity is derived from an electric double layer. Also, since an electrolytic solution was not used, leakage of the electrolytic solution did not occur as a matter of course.

Figure 5:
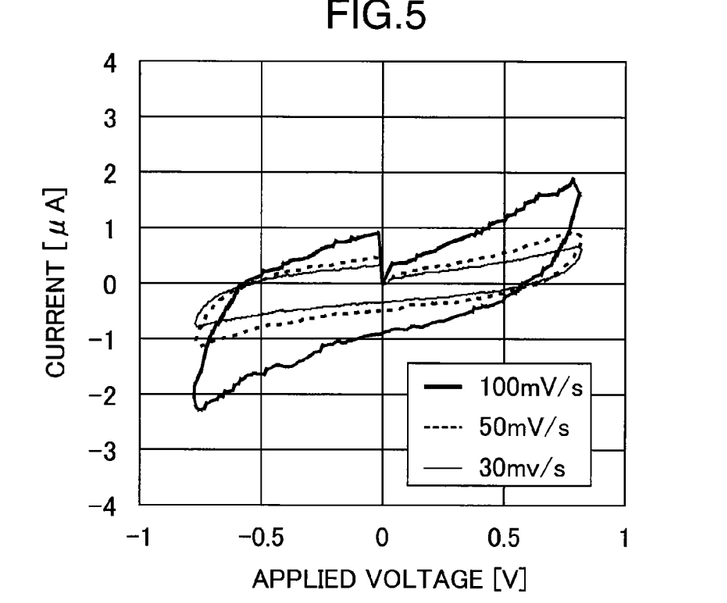
FIG. 5 is a schematic graph showing electrochemical characteristics in the all-solid-state electric double layer capacitor of Example 4 of the present invention.

When a voltage (ranging from −0.8 to 0.8 V) was applied to the all-solid-state electric double layer capacitor made of the solid electrolyte containing $Li_{0.3861}La_{0.5346}Al_{0.02}Ti_{0.98}O_3$ produced in Example 4 at a sweep rate of 30, 50 and 100 mV/s, the current value was measured at a measuring temperature of 20° C. The resulting cyclic voltammogram is shown in FIG. 5. It has been found that the solid electrolyte containing $Li_{0.3861}La_{0.5346}Al_{0.02}Ti_{0.98}O_3$ stores the capacitor's capacity similar to Example 1. The capacitor's capacity is shown in Table 1. It has also been confirmed that, with respect to the solid electrolyte containing $Li_{0.3861}La_{0.5346}Al_{0.02}Ti_{0.98}O_3$, the capacitor's capacity does not depend on the thickness of the electrolyte similar to Example 2. Thus, it was considered that the capacitor's capacity is derived from an electric double layer. Also, since an electrolytic solution was not used, leakage of the electrolytic solution did not occur as a matter of course.

Figure 6:
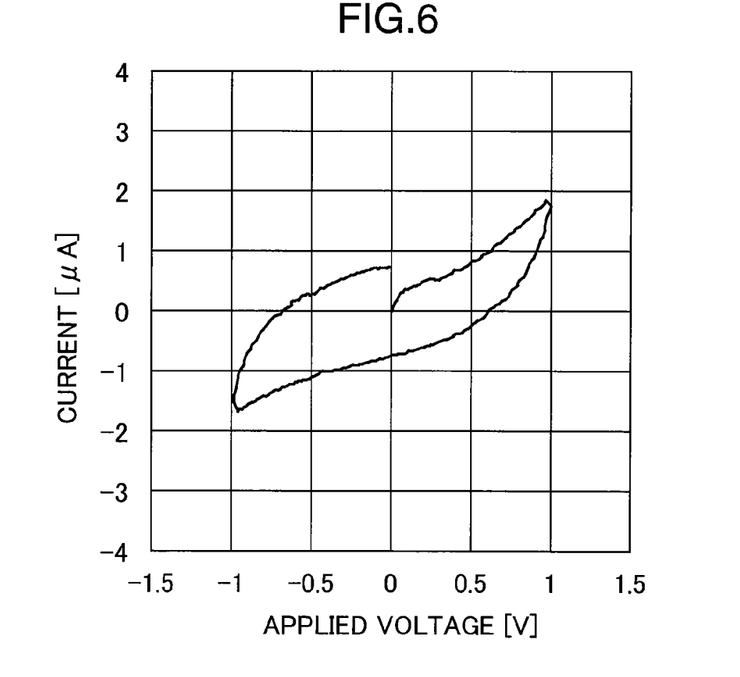
FIG. 6 is a schematic graph showing electrochemical characteristics in the all-solid-state electric double layer capacitor of Example 5 of the present invention.

When a voltage (ranging from −1.0 to 1.0 V) was applied to the all-solid-state electric double layer capacitor made of the solid electrolyte containing $Li_{0.5}La_{0.5}TiO_3$ produced in Example 5 at a sweep rate of 50 mV/s, the current value was measured at a measuring temperature of 20° C. The resulting cyclic voltammogram is shown in FIG. 6. It has been found that the solid electrolyte containing $Li_{0.5}La_{0.5}TiO_3$ stores the capacitor's capacity similar to Example 1. The capacitor's capacity is shown in Table 1. It has also been confirmed that, with respect to the solid electrolyte containing $Li_{0.5}La_{0.5}TiO_3$, the capacitor's capacity does not depend on the thickness of the electrolyte similar to Example 2. Thus, it was considered that the capacitor's capacity is derived from an electric double layer. Also, since an electrolytic solution was not used, leakage of the electrolytic solution did not occur as a matter of course.

Figure 7:
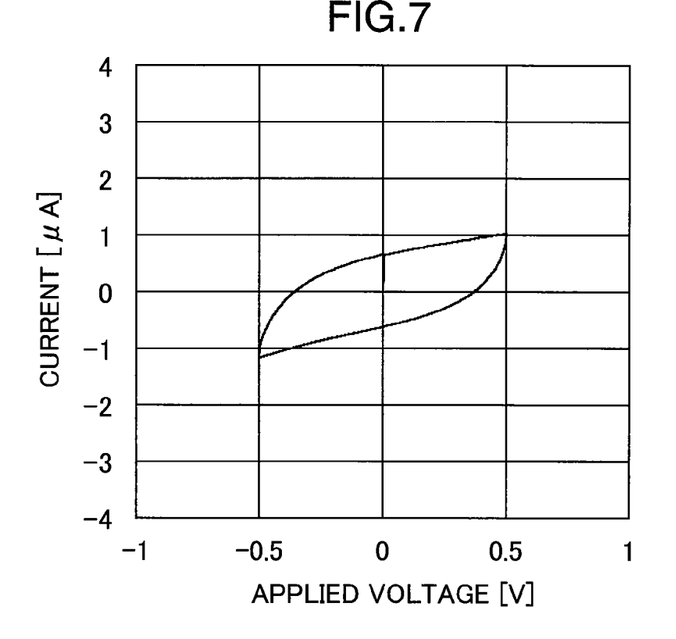
FIG. 7 is a schematic graph showing electrochemical characteristics in the all-solid-state electric double layer capacitor of Example 6 of the present invention.

When a voltage (ranging from −0.5 to 0.5 V) was applied to the all-solid-state electric double layer capacitor made of the solid electrolyte containing $Na_{1.4}Al_{0.4}Ti_{1.6}(PO_4)_3$ produced in Example 6 at a sweep rate of 50 mV/s, the current value was measured at a measuring temperature of 20° C. The resulting cyclic voltammogram is shown in FIG. 7. It has been found that the solid electrolyte containing $Na_{1.4}Al_{0.4}Ti_{1.6}(PO_4)_3$ stores the capacitor's capacity similar to Example 1. The capacitor's capacity is shown in Table 1. It has also been confirmed that, with respect to the solid electrolyte containing $Na_{1.4}Al_{0.4}Ti_{1.6}(PO_4)_3$, the capacitor's capacity does not depend on the thickness of the electrolyte similar to Example 2. Thus, it was considered that the capacitor's capacity is derived from an electric double layer. Also, since an electrolytic solution was not used, leakage of the electrolytic solution did not occur as a matter of course.

Figure 8:
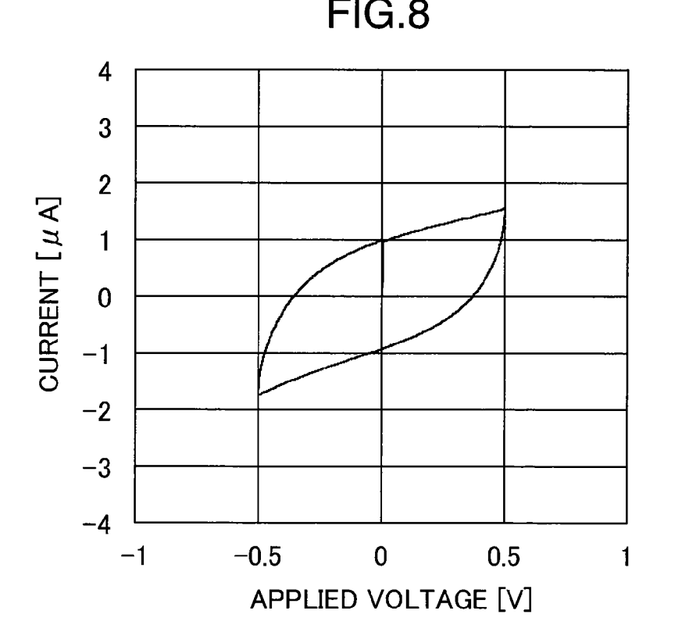
FIG. 8 is a schematic graph showing electrochemical characteristics in the all-solid-state electric double layer capacitor of Example 7 of the present invention.

When a voltage (ranging from −0.5 to 0.5 V) was applied to the all-solid-state electric double layer capacitor made of the solid electrolyte containing $Na_3Si_2Zr_{1.88}Y_{0.12}PO_{12}$ produced in Example 7 at a sweep rate of 80 mV/s, the current value was measured at a measuring temperature of 20° C. The resulting cyclic voltammogram is shown in FIG. 8. It has been found that the solid electrolyte containing $Na_3Si_2Zr_{188}Y_{0.12}PO_{12}$ stores the capacitor's capacity similar to Example 1. The capacitor's capacity is shown in Table 1. It has also been confirmed that, with respect to the solid electrolyte containing $Na_3Si_2Zr_{1.88}Y_{0.12}PO_{12}$, the capacitor's capacity does not depend on the thickness of the electrolyte similar to Example 2. Thus, it was considered that the capacitor's capacity is derived from an electric double layer. Also, since an electrolytic solution was not used, leakage of the electrolytic solution did not occur as a matter of course.

With respect to the all-solid-state electric double layer capacitors made of the solid electrolytes, each containing $Li_{1.3}Y_{0.3}Ti_{1.7}(PO_4)_3$, $Li_{1.2}Ga_{0.2}Ti_{1.8}(PO_4)_3$, $Li_{1.2}In_{0.2}Ti_{1.8}(PO_4)_3$, $Li_{0.3861}La_{0.5346}Cr_{0.02}Ti_{0.98}O_3$, $Li_{0.5}La_{0.5}Ti_{0.94}Sn_{0.06}O_3$, $Li_{0.5}La_{0.5}Ti_{0.94}Zr_{0.06}O_3$, $Li_{0.5}La_{0.5}Ti_{0.992}Mn_{0.008}O_3$, $Li_{0.5}La_{0.5}Ti_{0.992}Ge_{0.008}O_3$, $Na_{1.4}Al_{0.4}Ge_{1.6}(PO_4)_3$, $Na_{1.4}Al_{0.4}Sn_{1.6}(PO_4)_3$, $Na_{1.4}Al_{0.4}Zr_{1.6}(PO_4)_3$ and $Na_{1.4}Al_{0.4}Hf_{1.6}(PO_4)_3$, produced in Examples 8 to 19, the same results as in Example 1 were obtained.

When a voltage (ranging from −0.8 to 0.8 V) was applied to the all-solid-state electric double layer capacitor made of the solid electrolyte containing $Li_{1.3}Al_{0.3}Ti_{1.7}(PO_4)_3$ produced in Example 20 at a sweep rate of 50 mV/s, the current value was measured at a measuring temperature of 20° C. The capacitor's capacity is shown in Table 1.

When a voltage (ranging from −0.8 to 0.8 V) was applied to the all-solid-state electric double layer capacitor having a current collector structure different from that in Example 1 produced in Example 21, namely, an all-solid-state electric double layer capacitor which has not a structure in which current collectors face each other with the solid electrolyte containing $Li_{13}Al_{0.3}Ti_{1.7}(PO_4)_3$ interposed therebetween, but a structure in which current collectors are formed at one side of the solid electrolyte at a sweep rate of 50 mV/s, the current value was measured at a measuring temperature of 20° C. The capacitor's capacity is shown in Table 1.

TABLE 1

| | Capacitor's Capacity (μF) |
|---|---|
| Example 1 | 20 |
| Example 3 | 17 |
| Example 4 | 10 |
| Example 5 | 17 |
| Example 6 | 18 |
| Example 7 | 18 |
| Example 20 | 127 |
| Example 21 | 18 |

<Evaluation of Heat Resistance>

The all-solid-state electric double layer capacitors produced in Examples 1 to 21 were placed in a constant-temperature bath at 300° C. and maintained for 5 hours. The electrostatic capacity was compared before and after placing each all-solid-state electric double layer capacitor in the constant-temperature bath. Capacity retention of each of the all-solid-state electric double layer capacitors was approximately 100%.

Separately, the electric double layer capacitor of Comparative Example was placed in a constant-temperature bath at 300° C. and maintained for 5 hours, and then the electrostatic capacity was compared before and after placing the all-solid-state electric double layer capacitor in the constant-temperature bath. As a result, capacity retention was approximately 0 and the appearance changed. The reason is considered to be that an electrolytic solution was decomposed by maintaining at 300° C.

Example 22

Figure 10:
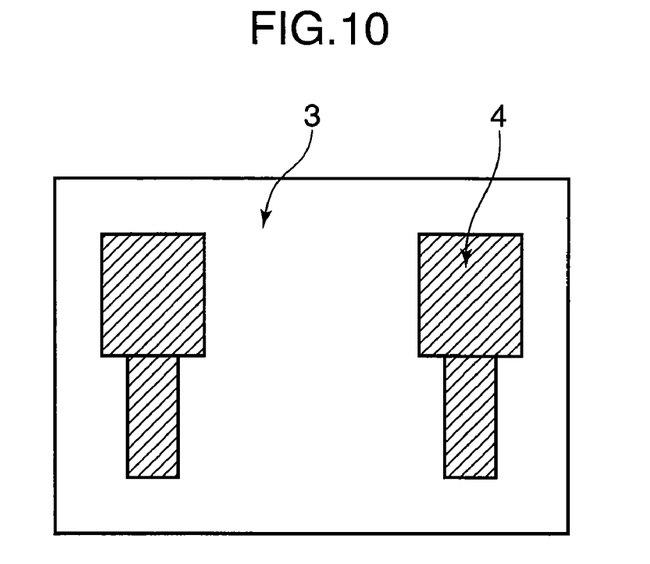
FIG. 10 is a schematic view of a printed circuit board in Example 22 of the present invention.
Figure 11:
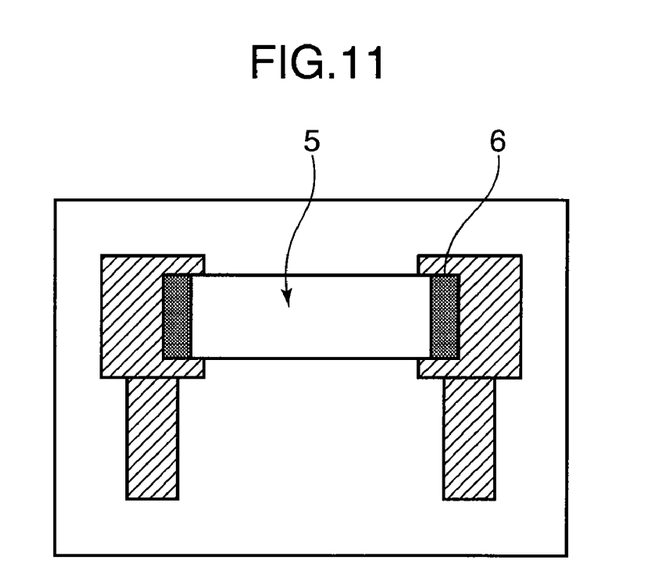
FIG. 11 is a schematic view of a printed circuit board having the all-solid-state electric double layer capacitor installed therein in Example 22 of the present invention.

A printed circuit board having a circuit pattern shown in FIG. 10 was produced. As shown in FIG. 11, the tip-shaped all-solid-state electric double layer capacitor thus produced was reflow-soldered on the printed circuit board shown in FIG. 10. Reflow soldering was performed under the conditions of a temperature of 270° C. for 2 seconds. The capacitor's capacity was measured before and after reflow soldering. Capacity retention of the tip-shaped all-solid-state electric double layer capacitor was approximately 100%.

As described in detail above, one aspect of the present invention is an all-solid-state electric double layer capacitor comprising a solid electrolyte and a current collector, wherein the solid electrolyte is an inorganic solid electrolyte.

With the above constitution, since the solid electrolyte is an inorganic solid electrolyte, the resulting capacitor has high capacity and is free from any fear of leakage of an electrolytic solution, and also ensures high heat resistance and enables a low process cost.

In the present invention, it is preferred to contain a Li-ion conductive compound as the inorganic solid electrolyte. With the above constitution, it is possible to obtain a solid electrolyte of a Li-ion conductor, which has high ionic conductivity and low electron conductivity and is also comparatively less likely to react with water.

Also, in the present invention, it is preferred to contain a Na-ion conductive compound as the inorganic solid electrolyte. With the above constitution, it is possible to obtain a solid electrolyte of a Na-ion conductor, which not only has high ionic conductivity, low electron conductivity and low reactivity with water, but also shows a wide operable temperature range of an electric double layer capacitor.

In the present invention, the Li-ion conductive compound is preferably a phosphate compound represented by the general formula:

$Li_{1+X}M^1{}_XTi_{2-X}(PO_4)_3$ (where $M^1$ represents at least one kind of metal selected from the group consisting of Al, Y, Ga, In and La, and X satisfies the following relation: $0 \leqq X \leqq 0.6$). Since the phosphate compound shows high ionic conductivity at room temperature, high-capacity Li-ion conductor can be obtained.

Also, in the present invention, the Li-ion conductive compound is preferably a phosphate compound represented by $LiSn_2(PO_4)_3$. In the case of the phosphate compound, since a sintering temperature during synthesis is low and $SnO_2$ used as a raw material is cheap, a Li-ion conductor can be obtained at low cost.

Furthermore, in the present invention, the Li-ion conductive compound is preferably an oxide represented by the general formula: $(Li_{0.39}La_{0.54})_{1-Y/2}M^2{}_YTi_{1-Y}O_3$ (where $M^2$ represents at least one kind of metal selected from the group consisting of Al and Cr, and Y satisfies the relation:

$0 \leq Y \leq 0.06$). The oxide is a Li-ion conductor which has high ionic conductivity and high density.

The Li-ion conductive compound is also preferably an oxide represented by the general formula: $(Li_{0.5}La_{0.5})Ti_{1-Z}M^3{}_ZO_3$ (where $M^3$ represents at least one kind of metal selected from the group consisting of Ge, Sn, Mn and Zr, and Z satisfies the relation: $0 \leq z \leq 1$). The oxide is a Li-ion conductor which has high ionic conductivity and high density.

Also, in the present invention, the Na-ion conductive compound is preferably an oxide represented by the general formula: $Na_{1+\gamma}Zr_{2-\beta}Y_\beta P_{3-\gamma}Si_\gamma O_{12}$ (where γ satisfies the relation: $0 \leq \gamma \leq 3$, and β satisfies the relation: $0 \leq \beta \leq 2$). The oxide is a Na-ion conductor which enables a low process cost because of a comparatively low synthesis temperature, and also has high ionic conductivity.

Furthermore, the Na-ion conductive compound is preferably a phosphate compound represented by the general formula: $Na_{1+\alpha}M^4{}_\alpha M^5{}_{2-\alpha}(PO_4)_3$ (where $M^4$ represents at least one kind of metal selected from Al and In, $M^5$ represents at least one kind of metal selected from the group consisting of Ge, Sn, Ti, Zr and Hf, and a satisfies the following relation: $0 \leq \alpha \leq 2$). The phosphate compound is a Na-ion conductor which enables a low process cost because of a comparatively low synthesis temperature, and also has high ionic conductivity.

The all-solid-state electric double layer capacitor of the present invention preferably has a structure in which the current collectors face each other with the solid electrolyte interposed therebetween. With the above constitution, it is possible to obtain an electric double layer capacitor which has low internal resistance and is thin.

Furthermore, the all-solid-state electric double layer capacitor of the present invention preferably has a structure in which the solid electrolytes and the current collectors are alternately laminated. With the above constitution, it is possible to easily obtain an electric double layer capacitor which has high capacity and is thin.

The all-solid-state electric double layer capacitor of the present invention has high capacity and is free from any fear of leakage of an electrolytic solution, and also enables a low process cost and is suited for mounting through reflow. Therefore, the all-solid-state electric double layer capacitor can also be utilized as an all-solid-state electric double layer capacitor having improved reliability and productivity.

This application is based on Japanese Patent application serial no. 2006-314663 filed in Japan Patent Office on Nov. 21, 2006, the contents of which are hereby incorporated by reference.

Although the present invention has been fully described by way of example, it is to be understood that various changes and modifications will be apparent to those skilled in the art. Therefore, unless otherwise such changes and modifications depart from the scope of the present invention hereinafter defined, they should be construed as being included therein.

The invention claimed is:

1. An all-solid-state electric double layer capacitor comprising a solid electrolyte and a current collector, wherein the solid electrolyte is an inorganic solid electrolyte,
the inorganic solid electrolyte comprises at least one kind of compound selected from the group consisting of a Li-ion conductive compound and a Na-ion conductive compound,
the Li-ion conductive compound is at least one kind of a compound selected from the group consisting of a phosphate compound represented by the general formula: $Li_{1+X}M^1{}_XTi_{2-X}(PO_4)_3$ (where $M^1$ represents at least one kind of metal selected from the group consisting of Al, Y, Ga, In and La, and X satisfies the following relation: $0 \leq X \leq 0.6$),
an oxide represented by the general formula: $(Li_{0.39}La_{0.54})_{1-Y/2}M^2{}_YTi_{1-Y}O_3$ (where $M^2$ represents at least one kind of metal selected from the group consisting of Al and Cr, and Y satisfies the following relation: $0 \leq Y \leq 0.06$), and
an oxide represented by the general formula $(Li_{0.05}La_{0.5})Ti_{1-Z}M^3{}_ZO_3$, (where $M^3$ represents at least one kind of metal selected from the group consisting of Ge, Sn, Mn and Zr, and Z satisfies the following relation: $0 \leq Z \leq 1$),
the Na-ion conductive compound is at least one kind of a compound selected from the group consisting of an oxide represented by the general formula: $Na_{1+\gamma}Zr_{2-\beta}Y_\beta P_{3-\gamma}Si_\gamma O_{12}$ (where y satisfies the following relation: $0 \leq \gamma \leq 3$, and β satisfies the following relation: $0 \leq \beta \leq 2$) and a phosphate compound represented by the general formula: $Na_{1+\alpha}M^4{}_\alpha M^5{}_{2-\alpha}(PO_4)_3$ (where $M^4$ represents at least one kind of metal selected from Al and In, $M^5$ represents at least one kind of metal selected from the group consisting of Ge, Sn, Ti, Zr and Hf, and a satisfies the following relation: $0 \leq \alpha \leq 2$).

2. The all-solid-state electric double layer capacitor according to claim 1, wherein the current collectors face each other with the solid electrolyte interposed therebetween.

3. The all-solid-state electric double layer capacitor according to claim 1, wherein the solid electrolytes and the current collectors are alternately laminated.

* * * * *